(12) United States Patent
Ohshima

(10) Patent No.: US 10,312,804 B2
(45) Date of Patent: Jun. 4, 2019

(54) POWER SUPPLY APPARATUS WITH POWER FACTOR CORRECTION USING FIXED ON AND OFF PERIODS

(71) Applicant: Shunzou Ohshima, Toyokawa (JP)

(72) Inventor: Shunzou Ohshima, Toyokawa (JP)

( * ) Notice: Subject to any disclaimer, the term of this patent is extended or adjusted under 35 U.S.C. 154(b) by 0 days.

(21) Appl. No.: 16/073,515

(22) PCT Filed: Feb. 5, 2016

(86) PCT No.: PCT/JP2016/053542
§ 371 (c)(1),
(2) Date: Jul. 27, 2018

(87) PCT Pub. No.: WO2017/134824
PCT Pub. Date: Aug. 10, 2017

(65) Prior Publication Data
US 2019/0044439 A1 Feb. 7, 2019

(51) Int. Cl.
*H02M 1/42* (2007.01)
*H02M 3/155* (2006.01)
(Continued)

(52) U.S. Cl.
CPC ........... *H02M 3/155* (2013.01); *H02J 7/0063* (2013.01); *H02M 1/08* (2013.01); *H02M 1/4208* (2013.01); *H02M 3/156* (2013.01); *H02M 7/12* (2013.01)

(58) Field of Classification Search
CPC ..... H02M 1/42; H02M 1/4208; H02M 1/4225
(Continued)

(56) References Cited

U.S. PATENT DOCUMENTS 4,430,608 A 2/1984 Nesler
4,890,009 A 12/1989 Miyazaki et al.
(Continued)

FOREIGN PATENT DOCUMENTS

EP 0785611 A3 11/1999
EP 1693942 A1 8/2006
(Continued)

OTHER PUBLICATIONS

English translation of the International Search Report dated Oct. 10, 2017 for parent application No. PCT/JP2016/053542.
(Continued)

*Primary Examiner* — Alex Torres-Rivera
(74) *Attorney, Agent, or Firm* — J-Tek Law PLLC; Jeffrey D. Tekanic; Scott T. Wakeman

(57) ABSTRACT

A full-wave rectifier-circuit (110) supplies a pulsating-DC-voltage (Vdc) obtained by rectifying an AC voltage (Vac). A switching element (T131) consisting of a power supply apparatus (130) is turned on during a fixed on-period Mon and turned off during a fixed off-period Moff (=M-Mon) in each fixed control period M. When the switching element (T131) is turned on, a current (I2) caused by electric charge accumulated in a capacitor (C132) flows through a path formed by an inductor (L131) and the switching element (T131). When the switching element (T131) is turned off, a flywheel current (I3) caused by electromagnetic energy accumulated in the inductor (L131) flows through a path formed by a diode (D131) and a parallel circuit consisting of a capacitor (C131) and a load (120), and a current (I1) is supplied from the full-wave rectifier circuit (110) to the capacitor (C132) via an inductor (L132). A power supply apparatus (100) is configured such that the current (I1) continues to flow through the capacitor (C132) while the switching element (T131) is off.

10 Claims, 6 Drawing Sheets

(51) Int. Cl.
*H02M 7/12* (2006.01)
*H02J 7/00* (2006.01)
*H02M 1/08* (2006.01)
*H02M 3/156* (2006.01)

(58) Field of Classification Search
USPC ........................................................ 323/207
See application file for complete search history.

(56) References Cited

U.S. PATENT DOCUMENTS

| | | | |
|---|---|---|---|
| 4,929,884 A | 5/1990 | Bird et al. | |
| 4,937,697 A | 6/1990 | Edwards et al. | |
| 5,783,915 A | 7/1998 | Shida et al. | |
| 5,905,615 A | 5/1999 | Rivetti et al. | |
| 5,914,586 A | 6/1999 | Fujita et al. | |
| 5,998,981 A | 12/1999 | Houghton et al. | |
| 6,222,355 B1 | 4/2001 | Ohshima et al. | |
| 7,030,582 B2 | 4/2006 | Masino | |
| 7,079,368 B2 | 7/2006 | Ishikawa et al. | |
| 7,177,130 B2 | 2/2007 | Ohshima | |
| 7,248,452 B2 | 7/2007 | Ohshima | |
| 7,443,645 B2 | 10/2008 | Ohshima | |
| 8,315,028 B2 | 11/2012 | Ohshima | |
| 9,705,394 B2 | 7/2017 | Ohshima | |
| 2001/0010458 A1 | 8/2001 | Ohshima | |
| 2002/0012216 A1 | 1/2002 | Ohshima | |
| 2004/0207967 A1 | 10/2004 | Ohshima | |
| 2004/0222759 A1 | 11/2004 | Ohshima | |
| 2005/0088130 A1 | 4/2005 | Ohshima | |
| 2005/0104546 A1 | 5/2005 | Ohshima | |
| 2005/0116672 A1 | 6/2005 | Ohshima | |
| 2005/0157441 A1 | 7/2005 | Black | |
| 2005/0275990 A1 | 12/2005 | Ohshima | |
| 2005/0286200 A1 | 12/2005 | Ohshima | |
| 2006/0007626 A1 | 1/2006 | Ohshima | |
| 2006/0187604 A1 | 8/2006 | Ohshima | |
| 2007/0008672 A1 | 1/2007 | Ohshima | |
| 2007/0064368 A1 | 3/2007 | Ohshima | |
| 2007/0103832 A1 | 5/2007 | Ohshima | |
| 2007/0139841 A1 | 6/2007 | Ohshima | |
| 2010/0110599 A1 | 5/2010 | Ohshima | |
| 2010/0118461 A1 | 5/2010 | Ohshima | |
| 2010/0127677 A1 | 5/2010 | Ohshima | |
| 2011/0019323 A1 | 1/2011 | Ohshima | |
| 2011/0075309 A1 | 3/2011 | Ohshima | |
| 2011/0085275 A1 | 4/2011 | Ohshima | |
| 2011/0096571 A1 | 4/2011 | Usuda et al. | |
| 2011/0110009 A1 | 5/2011 | Sugimoto et al. | |
| 2011/0254524 A1 | 10/2011 | Ishii | |
| 2012/0153914 A1 | 6/2012 | Ohshima et al. | |
| 2012/0194164 A1* | 8/2012 | Logiudice | H02M 3/005 323/312 |
| 2012/0242298 A1* | 9/2012 | Chu | H02M 1/4208 323/209 |
| 2012/0262082 A1 | 10/2012 | Esaki et al. | |
| 2012/0319604 A1* | 12/2012 | Walters | H02M 3/1582 315/200 R |
| 2013/0314961 A1 | 11/2013 | Eom et al. | |
| 2015/0009728 A1* | 1/2015 | Sugita | H02M 3/156 363/45 |
| 2015/0012362 A1 | 1/2015 | Ohshima | |
| 2016/0150609 A1* | 5/2016 | Seki | H05B 33/0815 315/200 R |

FOREIGN PATENT DOCUMENTS

| | | |
|---|---|---|
| JP | H09201043 A | 7/1997 |
| JP | 2005136942 A | 5/2005 |
| JP | 2006060971 A | 3/2006 |
| JP | 2009071370 A | 4/2009 |
| JP | 2011078261 A | 4/2011 |
| JP | 2011091974 A | 5/2011 |
| JP | 2012226924 A | 11/2012 |
| JP | 2012227845 A | 11/2012 |
| JP | 2012235398 A | 11/2012 |
| JP | 2014054157 A | 3/2014 |
| WO | 2013165004 A1 | 11/2013 |

OTHER PUBLICATIONS

English translation of the Written Opinion of the International Searching Authority for parent application No. PCT/JP2016/053542.

\* cited by examiner

POWER SUPPLY APPARATUS WITH POWER FACTOR CORRECTION USING FIXED ON AND OFF PERIODS

CROSS-REFERENCE

This application is the US national stage of International Patent Application No. PCT/JP2016/053542 filed on Feb. 5, 2016.

TECHNICAL FIELD

The present invention relates to a power supply apparatus that supplies DC power to a load, and more particularly, to a power supply apparatus that can improve efficiency.

BACKGROUND

A conventional power supply apparatus that supplies DC power to a load is shown in Japanese Patent Application Laid-Open Publication No. H9-47024. A circuit diagram of the conventional power supply apparatus is shown in FIG. 6. The power supply apparatus 400 shown in FIG. 6 is configured as a step-down AC-DC convertor having a full-wave rectifier circuit 410, a low-pass filter 480, a power supply circuit 430 for supplying DC power to a load 420, and a control circuit 440 for controlling the power supply circuit 4300. The full-wave rectifier circuit 4100 converts an AC voltage Vac of an AC power source 10 to a DC voltage (pulsating DC voltage) Vdc obtained by full-rectifying the AC voltage Vac. An N-type MOSFET is used as a switching element T431 of the power supply circuit 430. The power supply circuit 430 has a power factor correction (PFC) function for suppressing an amplitude of a harmonic current less than a limit value (referred to as "PFC Standard"). The control circuit 440 turns on the switching element T431 in a fixed control period and turns off the switching element T431 when a drain current of the switching element T431 (voltage drop across a current detecting resistor R431) becomes larger than a threshold value.

In the power supply apparatus 400 shown in FIG. 6, when the switching element T431 is turned on, a current I1 flows through a path formed by the full-wave rectifier circuit 410, the low-pass filter 480, an inductor L431, a parallel circuit consisting of the load 420 and a capacitor C431, the switching element T431, the current detecting resistor R431, and the earth (ground). At this time, electromagnetic energy is accumulated in the inductor L431 (inductance L). When the switching element T431 is turned off, a flywheel current I3 caused by the electromagnetic energy accumulated in the inductor L431 flows through a path formed by the inductor L431, the parallel circuit consisting of the load 420 and the capacitor C431, a diode D431 (referred to as "flywheel diode").

In the power supply apparatus 400 shown in FIG. 6, a magnitude (amplitude) of the current I1 is variable in accordance with a magnitude (amplitude) of the DC voltage Vdc. Thus, a power factor cos θ of AC input power (θ: phase difference between AC voltage Vac and AC input current Iac) approaches "1".

The current I1 does not flow while the switching element T431 is off. That is, the current I1 intermittently flows. Therefore, harmonic currents are included in the current I1. A low-pass filter 480 is provided to prevent the harmonic currents from propagating to the AC power source side.

PRIOR ART DOCUMENT

Patent Document

Patent literature No. 1: Japanese Patent Application Laid-Open Publication No. H9-47024

SUMMARY OF THE INVENTION

The low-pass filter 480 provided in the above-described conventional power supply apparatus 400 is composed of a capacitors having a small capacitance and an inductors having a large inductance in order to prevent a reduction of the power factor. In general, to increase the inductance of an inductor, a larger number of turns of the wire forming the inductor is required. Since the size of an inductor becomes large if the inductor is formed using a thick wire, it is necessary to form the inductor using a thin wire in order to minimize the size of the inductor. But, if the inductor is formed using a thin wire, the resistance of the inductor increases, thereby increasing inductor losses.

Thus, there is a limit to improving the efficiency of the above-described conventional power supply apparatus owing to losses from the inductor comprising the low-pass filter that prevents harmonic currents from flowing.

Further, the above-described conventional power supply apparatus 400 includes the current detecting resistor R431 for detecting the drain current of the switching element T431 and is configured such that the switching element T431 is turned off when the voltage drop across the current detecting resistor R431 (drain current of the switching element T431) becomes larger than the threshold value. Therefore, the control circuit is complicated and the cost of the power supply apparatus is relatively high.

It is therefore one object of the present teachings to disclose a power supply apparatus that can improve efficiency with a simple structure and at a low cost.

A power supply apparatus according to a first aspect of the present invention comprises a first DC power source that generates a DC voltage obtained by rectifying an AC voltage between a positive electrode and a negative electrode, a power supply circuit arranged between the first DC power source and a load, and a control circuit for controlling the power supply circuit.

Preferably, a DC power source having a rectifier circuit that converts the AC voltage to the DC voltage (pulsating DC voltage) obtained by rectifying the AC voltage is used as the first DC power source. Typically, a full-wave rectifier circuit is used as the rectifier circuit. The terms "positive electrode" and "negative electrode" are used as terms that mean portions where the DC voltage is generated.

The power supply circuit has first and second capacitors, first and second inductors, a diode, and a first switching element.

The control circuitry is configured to turn on the first switching element during a fixed on-period Mon and turns off the first switching element during a fixed off-period Moff (=M−Mon) in each fixed control period M. For example, the control circuit controls the first switching element in synchronization with the clock signal that is H-level (or L-level) during a first period Ka equal to the on-period Mon and is L-level (or H-level) during a second period Kb equal to the off-period Moff in each clock signal period M equal to the control period M.

The power supply apparatus is configured such that when the first switching element is turned on, a discharging current caused by electric charge accumulated in the second capacitor flows through a path formed by the first inductor, a parallel circuit consisting of the first capacitor and the load, and the first switching element. Further, the power supply apparatus is configured such that when the first switching element is turned off, a flywheel current caused by an electromagnetic energy, that is accumulated in the first inductor while the first switching element is on, flows through a path formed by the parallel circuit consisting of the first capacitor and the load and the diode, and at the same time, a charging current is supplied from the first DC power source to the second capacitor via the second inductor.

Moreover, the power supply apparatus is configured such that the charging current continues to flow while the first switching element is off. For example, inductance of the second inductor, capacitance of the second capacitor, and the off-period Moff of the first switching element are set appropriately.

In the first aspect, since the current is continuously supplied from the DC power source during the control period M, harmonic components included in the current can be significantly suppressed. Thus, a power factor of an AC input power can be improved, and harmonic currents can be prevented from propagating to an AC power source side. Therefore, it is possible to remove the low-pass filter used in the conventional power supply apparatus, and thereby to downsize the power supply apparatus and improve efficiency. Further, parts and processes for detecting the current flowing through the first switching element are not required. Thus, it is possible to simplify a configuration. Moreover, since the low-pass filter and the parts for detecting the current are not required, it is possible to construct the power supply apparatus at low cost.

A power supply apparatus according to a second aspect of the present invention, similar to the first concept, comprises a first DC power source, a power supply circuit, and a control circuit. In the second aspect, the power supply circuit different from the power supply apparatus of the first aspect is used. That is, the power supply circuit of the first aspect is configured as a buck converter, while the power supply circuit of the second aspect is configured as a buck-boost converter.

The power supply circuit of the second aspect, similar to the power supply circuit of the first aspect, has first and second capacitors, first and second inductors, a diode, and a first switching element.

In the second aspect, the power supply apparatus is configured such that when the first switching element is turned on, a discharging current caused by electric charge accumulated in the second capacitor flows through a path formed by the first inductor and the first switching element. Further, the power supply apparatus is configured such that when the first switching element is turned off, a flywheel current caused by an electromagnetic energy, that is accumulated in the first inductor while the first switching element is on, flows through a path formed by the diode and a parallel circuit consisting of the first capacitor and a load, and at the same time, a charging current is supplied from the first DC power source to the second capacitor via the second inductor.

Moreover, similar to the first aspect, the power supply apparatus is configured such that the charging current continues to flow while the first switching is off.

The power supply apparatus according to the second aspect can achieve the same effect as the power supply apparatus according to the first aspect.

In a modification of the power supply apparatus according to the first or the second aspect, the control period M, L2 representing inductance of the second inductor, and Cp representing capacitance of the second capacitor are set such that $[M<\pi\times(L2\times Cp)^{1/2}]$ is satisfied.

In this modification, the power supply apparatus can be easily configured such that the current is continuously supplied from the DC power source during the control period M.

In a different modification of the power supply apparatus according to the first or the second aspect, the power supply apparatus is configured such that the flywheel current disappears within a period when the switching element is off. For example, the off-period Moff of the switching element is set appropriately.

In this modification, it is possible to prevent a reduction of efficiency and a disturbance of a current waveform that are caused by turning on the switching element at a time when the flywheel current is flowing.

In a different modification of the power supply apparatus according to the first or the second aspect, the control circuit has a second DC power source that generates a predetermined DC voltage between a first terminal and a second terminal and an on-period setting circuit that sets the on-period Mon of the switching element. Since the control period M is fixed, when the on-period Mon is set, the off-period Moff (=M−Mon) is also set.

The on-period setting circuit has first and second P-type MOSFETs, first and second N-type MOSFETs, first to third resistors, a third capacitor, and a second switching element.

Between the first terminal and the second terminal of the second DC power source, the first P-type MOSFET, the first resistor, the first N-type MOSFET, and the second resistor are arranged in series. A gate and a drain each of the first P-type MOSFET and the first N-type MOSFET are short-circuited. Thus, this series circuit constitutes a constant current circuit.

Further, between the first terminal and the second terminal of the second DC power source, the second P-type MOSFET, the second N-type MOSFET, and the third resistor are arranged in series. A gate of the second P-type MOSFET is connected to the gate of the first P-type MOSFET and a gate of the second N-type MOSFET is connected to the gate of the first N-type MOSFET. The third capacitor and the second switching element are arranged in parallel with the third resistor.

In this modification, a ratio of a channel width of the first P-type MOSFET to that of the second P-type MOSFET, a ratio of a channel width of the first N-type MOSFET to that of the second N-type MOSFET, and a ratio of resistance of the second resistor to that of the third resistor (ratio of resistance values) are set such that when the second switching element is on, a voltage between terminals (drain-source voltage) of the second P-type MOSFET is larger than a voltage between terminals of the second N-type MOSFET, and when the second switching element is off and the third capacitor is fully charged, the voltage between terminals of the second P-type MOSFET is smaller than the voltage between terminals of the second N-type MOSFET. Further, the second switching element is turned off at a start time of the control period M. The on-period setting circuit sets a period, that is from the start time of the control period M to a time when the voltage between terminals of the second P-type MOSFET becomes smaller than the voltage between terminals of the second N-type MOSFET, as the on-period Mon.

In this modification, it is possible to easily adjust a length of the on-period Mon of the switching element.

In another modification of the power supply apparatus according to the first or the second aspect, a third DC power source that generates a predetermined DC voltage between the positive electrode and the negative electrode is used instead of the first DC power source that generates the DC voltage obtained by rectifying the AC voltage between the positive electrode and the negative electrode. Preferably, a battery is used as the third DC power source.

In this modification, it is possible to suppress generation of harmonic components, and to provide a step-down DC-DC converter that is not necessary to detect a current flowing through the first switching element.

The power supply apparatus of the present invention can improve efficiency with a simple structure at a low cost.

Other features, effects and advantages of the present invention will be readily understood with reference to the specification, claims and accompanying drawings.

DETAILED DESCRIPTION

Figure 1:
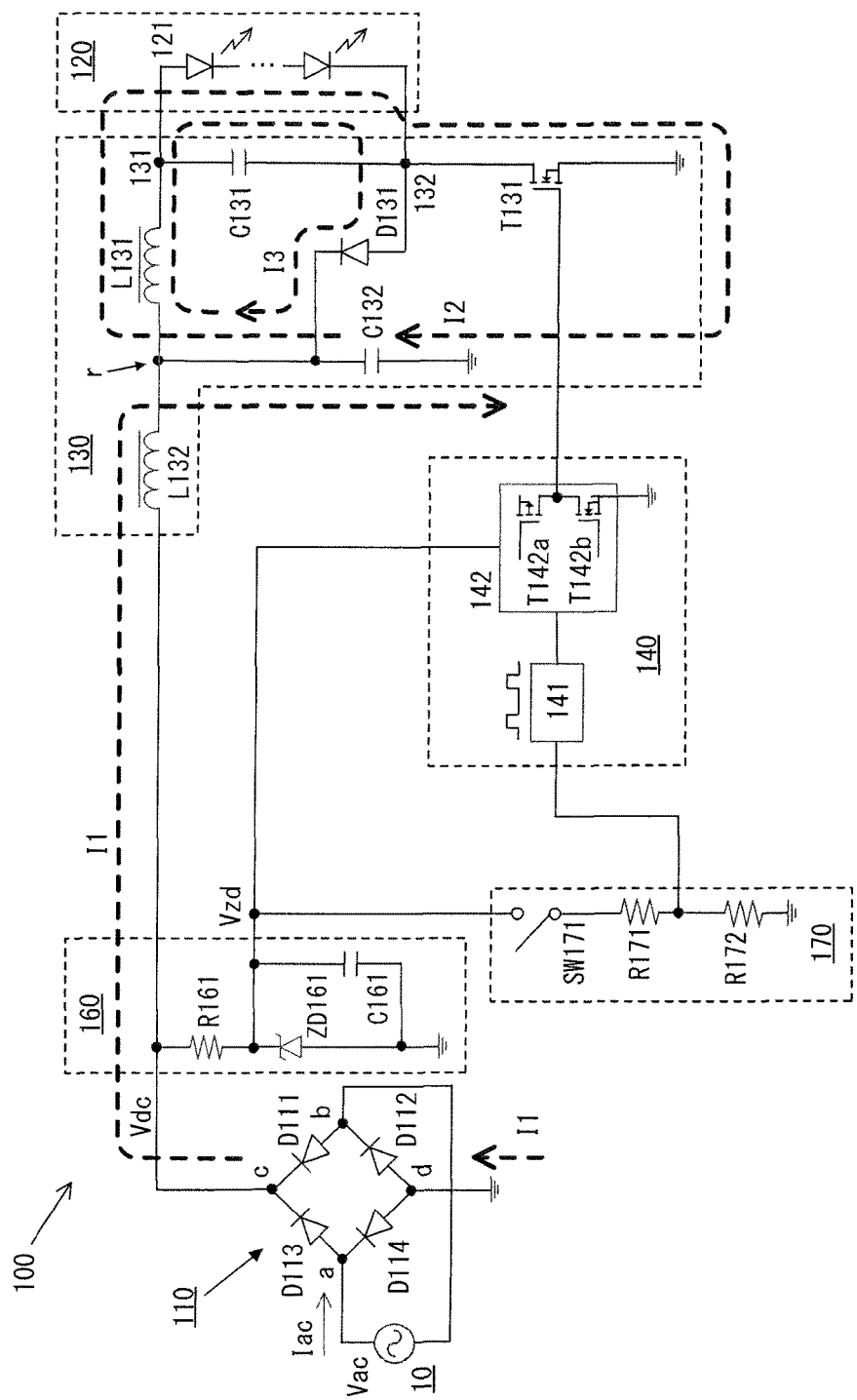
FIG. 1 is a circuit diagram showing a first embodiment of the power supply apparatus of the present invention.

The following detailed description is merely intended to teach a person skilled in the art detailed information for practicing preferred application examples of the present invention. The technical scope of the present invention is not limited by the detailed description, but is defined by the description of the claims. Therefore, combinations of features and steps within the following detailed description may not be necessary to practice the present invention in the broadest sense, and are merely intended to teach some representative examples of the present invention in the detailed description which is given with reference numerals included in the accompanying drawings.

Hereinafter, preferred embodiments of the present invention will be explained with reference to the drawings.

In the following description, a power supply apparatus of the present invention is configured as a step-down AC-DC converter that comprises a full-wave rectifier circuit for converting an AC voltage to a DC voltage and supplies DC power to a load having light emitting diodes (LEDs). Of course, the power supply apparatus of the present invention can be configured to supply DC power to various loads other than LEDs.

Furthermore, unless otherwise specified, the terms "voltage" and "current" are used as terms meaning respectively "magnitude of the voltage" and "magnitude of the current".

First Embodiment

FIG. 1 is a circuit diagram showing a first embodiment 100 of the power supply apparatus of the present invention. The power supply apparatus 100 of the first embodiment comprises a full-wave rectifier circuit 110 that converts an AC voltage Vac from an AC power source 10 to a DC voltage Vdc, a power supply circuit 130, a control circuit 140, a power circuit 160, and a drive signal output circuit 170.

The full-wave rectifier circuit 110 has diodes D111-D114 that are bridge-connected and generates the DC voltage Vdc, that is obtained by full-wave rectifying the AC voltage Vac applied between AC input terminals a and b, between a positive electrode c and a negative electrode d. The DC voltage Vdc is a pulsating DC voltage having a magnitude (amplitude) that varies in accordance with a magnitude (amplitude) of the AC voltage Vac.

In this embodiment, the negative electrode d of the full-wave rectifier circuit 110 is grounded. Therefore, grounding any one of terminals means that the terminal is connected to the negative electrode d.

In this embodiment, a full-wave rectifying circuit 110 is a representative example of "a first DC power source" of the present invention.

The power supply circuit 130 is arranged between the positive electrode c and the negative electrode d of the full-wave rectifier circuit 110 and between one terminal 131 and the other terminal 132 of the load 120, and supplies DC power to the load 120.

A configuration of the power supply circuit 130 will be explained.

A capacitor C131 having capacitance C1 is arranged between the one terminal 131 and the other terminal 132 of the load 120.

An inductor L131 having inductance L1 and an inductor L132 having inductance L2 are arranged in series between the one terminal 131 of the load 120 and the positive electrode c. Here, the inductor L131 is connected to the one terminal 131 and the inductor L132 is connected to the positive electrode c.

A switching element T131 is arranged between the other terminal 132 of the load 120 and the ground. In this embodiment, an N-type MOSFET is used as the switching element T131.

A capacitor C132 having capacitance Cp is arranged between the ground and a connection point r where the inductor L131 and the inductor L132 are connected.

A diode (flywheel diode) D131 is arranged between the other terminal 132 of the load 120 and the connection point r. Here, an anode of the diode D131 is connected to the other terminal 132 and a cathode is connected to the connection point r.

A switching element T131 is a representative example of "a first switching element" of the present invention, a capacitor C131 is a representative example of "a first capacitor" of the present invention, a capacitor C132 is a representative example of "a second capacitor" of the present invention, an inductor L131 is a representative example of "a first inductor" of the present invention, and an inductor L132 is a representative example of "a second inductor" of the present invention.

The power circuit 160 is arranged between the positive electrode c and the ground, and has a resistor R161, a Zener diode ZD161, and a capacitor C161. The power circuit 160 supplies a voltage Vzd determined by a Zener voltage of the Zener diode ZD161 to the control circuit 140 and the drive signal output circuit 170.

The drive signal output circuit 170 is arranged between a connection point (voltage Vzd) where the resistor R161 and the Zener diode ZD161 are connected and the ground, and has a switch SW171, resistors R171 and R172. When the switch SW171 is turned on, the drive signal output circuit 170 outputs a H-level drive signal, that instructs start of supplying DC power to the load 120, to a clock signal generating circuit 141 of the control circuit 140.

The control circuit 140 has the clock signal generating circuit 141 and a drive circuit 142.

The clock signal generating circuit 141 outputs a clock signal to an input terminal of the drive circuit 142 when a H-level drive signal is input from the drive signal output circuit 170.

The drive circuit 142 has switching elements T142a and T142b that are connected in series between the ground and the DC voltage Vzd generated by the power circuit 160. In this embodiment, a P-type MOSFET is used as the switching element T142a and an N-type MOSFET is used as the switching element T142b. A connection point (output terminal) where the switching elements T142a and T142b are connected is connected to a gate of the switching element T131 of the power supply circuit 130. The drive circuit 142 generates a drive voltage for turning on the switching element T131 or a drive voltage for turning off the switching element T131 to the output terminal based on the clock signal input to the input terminal.

In this embodiment, the clock signal generating circuit 141 generates a clock signal that becomes H-level during a first fixed period Ka and L-level during a second fixed period Kb (=M−Ka) in each fixed clock signal period M.

And, at the output terminal of the drive circuit 142, H-level drive voltage for turning on the switching element T131 is generated during the first period Ka when the clock signal is H-level, and L-level drive voltage for turning off the switching element T131 is generated during the second period Kb when the clock signal is L-level.

In this embodiment, the switching element T131 is turned on during a fixed on-period Mon (=first period Ka of the clock signal) and turned off during a fixed off-period Moff (=second period Kb of the clock signal) in each fixed control period M (=clock signal period M). That is, in this embodiment, the on-period Mon of T131 is equal (including "substantially equal") to the first period Ka of the clock signal and the off-period Moff of T131 is equal (including "substantially equal") to the second period Kb of the clock signal.

In this embodiment, any parts for detecting a current flowing through the switching element T131 are not provided, and processes for detecting a current and comparing the current with a threshold value are not performed.

Next, an operation of the power supply apparatus 100 of this embodiment will be explained.

In the following, each element may be represented by only reference numeral. For example, the switching element T131 being an N-type MOSFET may be represented by "T131".

When the switch SW171 is turned off, L-level drive signal is output from the drive signal output circuit 170. Accordingly, T131 is kept off. When T131 is off, a current I1 (charging current of the capacitor C132) flows through a path formed by the full-wave rectifier circuit 110 (DC voltage Vdc), the inductor L132, the capacitor C132, and the ground.

When the switch SW171 is turned on in this state, H-level drive signal is output from the drive signal output circuit 170. Accordingly, the clock signal generating circuit 141 starts to generate the clock signal.

The drive circuit 142 generates H-level drive voltage for turning on T131 at the output terminal during the first period Ka when the clock signal is H-level.

When T131 is turned on, a current I2 (discharging current of the capacitor C132), that is caused by electric charge accumulated in the capacitor C132, flows through a path formed by the capacitor C132, the inductor L131, a parallel circuit consisting of the load 120 and the capacitor C131, T131, and the ground. At this time, an electromagnetic energy $[L1 \times (I2)^2/2]$ is accumulated in the inductor L131.

When T131 is on, the voltage at the point r becomes lower than Vdc due to discharging of the capacitor C132. As a result, even while T131 is on, the current I1 flows through the path formed by the full-wave rectifier circuit 110, the inductor L132, the capacitor C132, and the ground.

Further, the drive circuit 142 generates L-level drive voltage for turning off T131 at the output terminal during the second period Kb when the clock signal is L-level.

When T131 is turned off, a current I3 (flywheel current), that is caused by the electromagnetic energy accumulated in the inductor L131, flows through a path formed by the inductor L131, the parallel circuit consisting of the load 120 and the capacitor C131, and the diode D131.

At the same time, the current I1 flows through the path formed by the full-wave rectifier circuit 110, the inductor L132, the capacitor C132, and the ground. As a result, the electric charge that is discharged while T131 is on is replenished to the capacitor C132.

In this embodiment, the clock signal period M, the inductance L2 of the inductor L132 and the capacitance Cp of the capacitor C132 are set such that the current I1 continues to flow while T131 is off. It will be described in detail later.

As described above, the current I1 flows even while T131 is on. Further, the power supply apparatus 100 is configured such that the current I1 continues to flow while T131 is off.

Thus, the current I1 continues to flow during one clock signal period M (=Ka+Kb), that is, during one control period M (=on-period Ma+off-period Mb). As a result, the current I1 is obtained by adding a current component an amplitude of which is synchronized with the DC voltage (pulsating DC voltage) Vdc to a current component an amplitude of which varies with the control period M.

Here, a current obtained by adding the current I1 to a current flowing through the power circuit 160 is equal to an absolute value of the AC input current Iac. Accordingly, continuing to flow the current I1 even while T131 is off means that the AC input current Iac continues to flow during one control period M (=one clock signal period M) of T131, and thereby it is possible to suppress generation of harmonic currents included in the AC current Iac.

Figure 6:
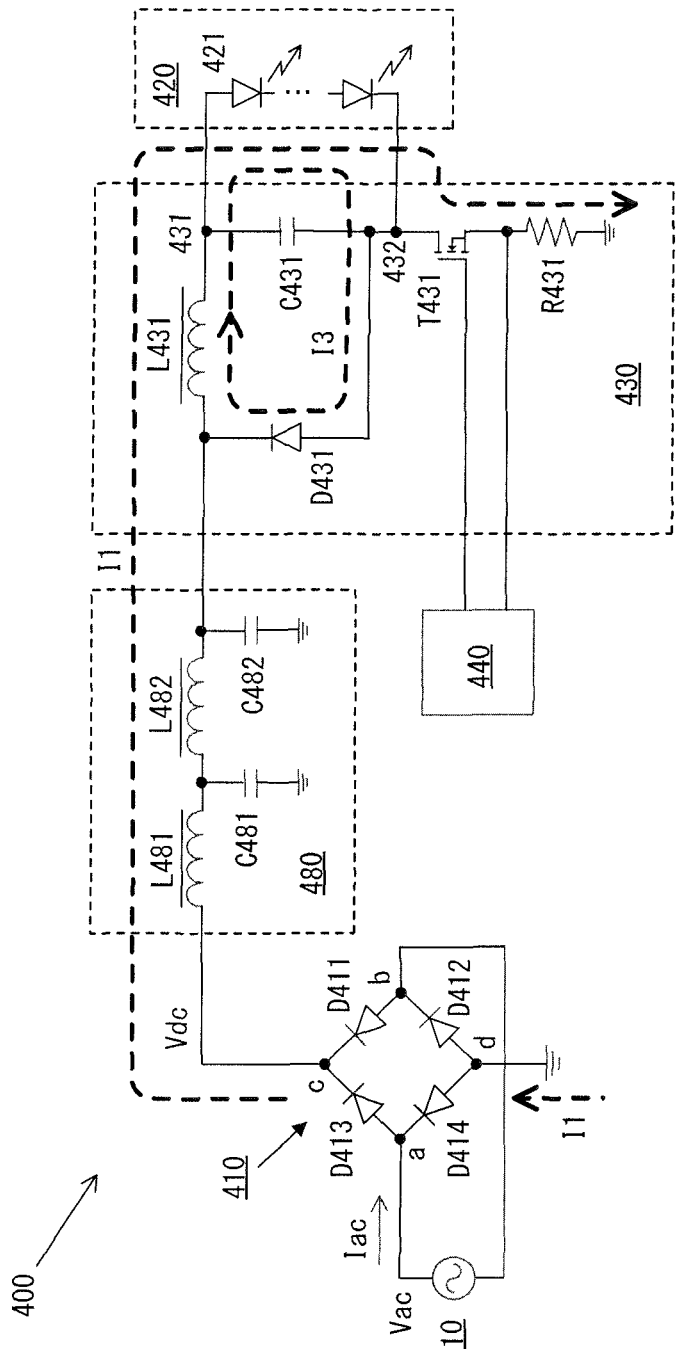
FIG. 6 is a circuit diagram showing a conventional power supply apparatus.

Therefore, it is possible to remove the low-pass filter 480 used in the conventional power supply apparatus 400 shown in FIG. 6. As a result, it is possible to improve the efficiency of the power supply apparatus and also to significantly reduce a size of a product shape.

Figure 3:
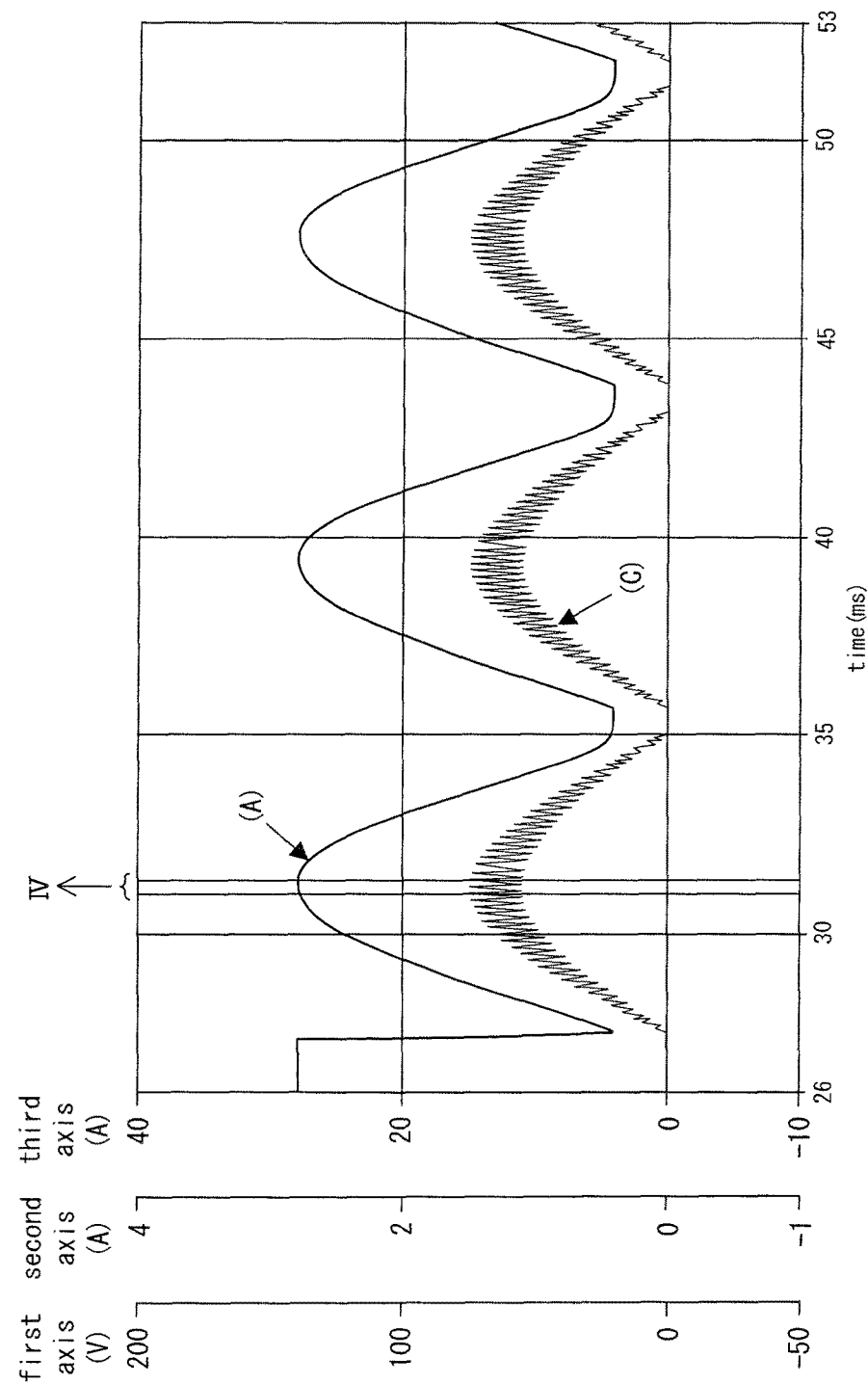
FIG. 3 is a chart showing simulated waveforms of the first embodiment.
Figure 4:
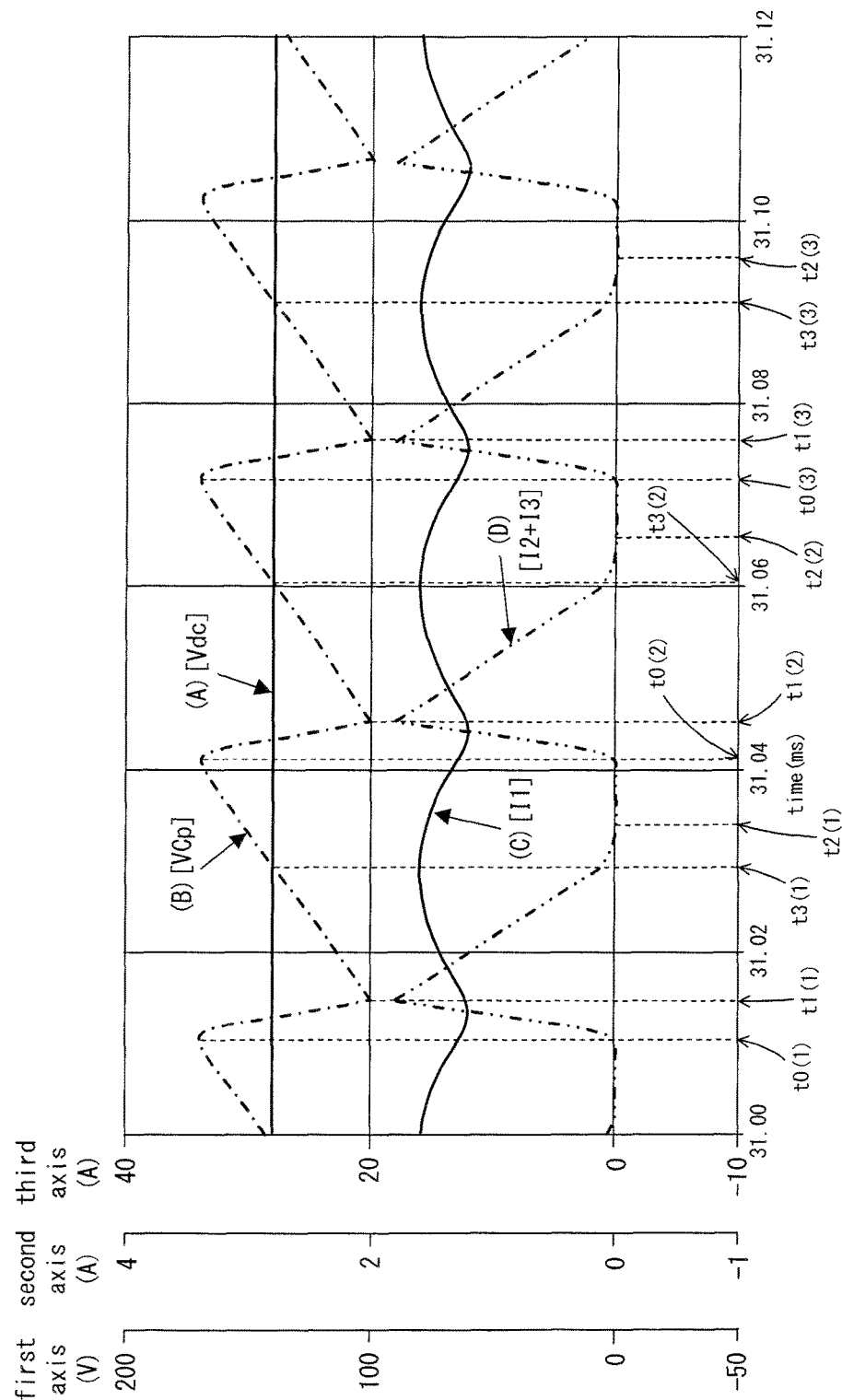
FIG. 4 is the enlarged view of the part IV in FIG. 3

Next, each operation of the power supply apparatus 100 of this embodiment will be explained. Each waveform is shown in FIGS. 3 and 4. Each waveform shown in FIGS. 3 and 4 will be described later.

First, charging and discharging operations of the capacitor C132 are explained.

When T131 is turned on, as described above, the current I2 caused by discharging of the capacitor C132 flows. Since a resistance value of a path through which the current I2 flows is very small, an ultimate current value (saturated current value) of the current I2 becomes very large and the current I2 increases linearly immediately after the current I2 starts to flow.

If VLED represents a voltage of the load 120 (load voltage) and VCp represents a voltage at a positive terminal of the capacitor C132 (voltage at the point r), a voltage VL1 across terminals of the inductor L131 when T131 is turned on is represented by equation (1).

$$VL1 = L1 \times \frac{dI2}{dt} = VCp - VLED \tag{1}$$

VCp decreases due to discharging of the capacitor C132 during the on-period of T131.

VCp is greater than Vdc ([VCp>Vdc]) at a time when T131 is turned on, then decreases rapidly during the on-period of T131. VCp becomes equal to Vdc ([VCp=Vdc]) in the decreasing process. And VCp becomes smaller than Vdc ([VCp<Vdc]) at a time when T131 shifts from on to off.

Since a position where VCp is equal to Vdc ([VCp=Vdc]) is, as described below, at a midpoint of a variable range of VCp or near the midpoint, an average value of VCp in the on-period of T131 can be approximated by Vdc.

By using this approximation, equation (1) can be rewritten to equation (2).

$$\frac{dI2}{dt} \approx \frac{Vdc - VLED}{L1} \tag{2}$$

That is, a rate of increase (increase slope) of I2 is proportional to (Vdc−VLED) and is inversely proportional to L1.

Vdc can be considered constant in one control period M. Further, it is assumed that T131 is turned on at a time [t=t0(=0)], I2 is zero [I2=0] at the time [t=t0]. Accordingly, I2 is expressed by equation (3).

$$I2 \approx \frac{Vdc - VLED}{L1} \times t \tag{3}$$

From equation (3), it can be understood that I2 increases linearly with the rate of increase that is proportional to (Vdc−VLED) and inversely proportional to L1.

It is assumed that T131 shifts from on to off a time [t=t1], electric discharge quantity Q1 that is discharged from the capacitor C132 during the on-period Mon of T131 is expressed by equation (4). In this case, since T131 is turned on from the time [t=t0] to the time [t=t1], the on-period Mon is equal to t1 [Mon=t1]. Here, an initial value of the electric discharge quantity Q1 is zero.

$$Q1 = \int_0^{t1} I2 dt = \frac{Vdc - VLED}{2 \times L1} \times t1^2 \tag{4}$$

Since T131 is on during the first period Ka when the clock signal is H-level, the on-period Mon of T131 is fixed. Therefore, the electric discharge quantity Q1 of the capacitor C132 during the on-period Mon (=t1) of T131 is proportional to (Vdc−VLED).

From equation (4), the electric discharge quantity Q1 is proportional to a square of the on-period Mon (=t1) of T131. Accordingly, if the on-period Mon of T131 varies, the electric discharge quantity Q1 is significantly changed. Therefore, fixing the on-period Mon of T131 makes an effect that a variation of the electric discharge quantity Q1 can be prevented.

If it is assumed that Vdc is constant in one control period M, the electric charge quantity of the capacitor C132 in the off-period Moff of T131 is equal to the electric discharge quantity Q1 of the capacitor C132 in the on-period Mon (=t1) of T131.

However, in practice, Vdc pulsates in a longer period than the control period M, and thereby Vdc slightly varies even in the control period M. If $\Delta Vdc$ represents an amount of variation of Vdc (voltage difference) in one control period M of T131, $\Delta Vdc$ becomes plus [$\Delta Vdc>0$] in a increasing process of Vdc, and becomes zero [$\Delta Vdc=0$] when Vdc is a peak value, and becomes minus [$\Delta Vdc<0$] in an decreasing process of Vdc.

In the increasing process of Vdc, an amount of electric charge ($\Delta Vdc \times Cp$) is charged in the capacitor C132, and in the decreasing process of Vdc, an amount of electric charge ($\Delta Vdc \times Cp$) is discharged from the capacitor C132. Accordingly, the electric charge quantity of the capacitor C132 in one control period M of T131 (hereinafter referred to as "Cp electric charge quantity") is expressed by equation (5).

$$Cp \text{ electric charge quantity} = Q1 + \Delta Vdc \times Cp \tag{5}$$

If the capacitance Cp of C132 is set such that ($\Delta Vdc \times Cp$) is negligible small compared to Q1 [($\Delta Vdc \times Cp$)≪Q1], the Cp electric charge quantity can be regarded as equal to the electric discharge quantity Q1.

The Cp electric charge quantity is supplied by the AC input current Iac. Therefore, if it is assumed that the Cp electric charge quantity is regarded as equal to the electric discharge quantity Q1, the AC input current Iac in the control period M is determined by the electric discharge quantity Q1.

If the electric discharge quantity Q1 is proportional to (Vdc−VLED), the AC input current Iac is proportional to (Vac−VLED). That is, if it can be regarded that VLED is constant, the AC input current Iac is varies in synchronization with the variation of the AC voltage Vac.

Next, the flywheel current I3 that flows when T131 is turned off will be explained.

When T131 is turned off, the drain voltage of T131 is raised by a counter electromotive force generated in the inductor L131. Thus, the diode D131 is forward biased, and thereby the flywheel current I3 flows through the path formed by the inductor L131, the parallel circuit consisting of the load 120 and the capacitor C131, and the diode D131. When VD1 represents a forward voltage drop of the diode D131, I3 is expressed by equation (6).

$$L1 \times \frac{dI3}{dt} + VLED + VD1 = 0 \tag{6}$$

T131 is turned on at the time t0 (=0) and turned off at the time t1. When I3(t) represents I3 at the time t1, I3 can be expressed by equation (7).

$$I3 = -\frac{VLED + VD1}{L1} \times (t - t1) + I3(t1) \tag{7}$$

Here, equation (8) is established.

$$I3(t1) = I2(t1) \tag{8}$$

$$I2(t1) \approx \frac{Vdc - VLED}{L1} \times t1$$

Accordingly, equation (7) can be rewritten to equation (9).

$$I3 = -\frac{VLED + VD1}{L1} \times (t - t1) + \frac{Vdc - VLED}{L1} \times t1 \quad (9)$$

When t2 represents a time when I3 becomes zero [I3=0], equation (10) is satisfied.

$$0 = -\frac{VLED + VD1}{L1} \times (t2 - t1) + \frac{Vdc - VLED}{L1} \times t1 \quad (10)$$

$$(t2 - t1) = \frac{Vdc - VLED}{VLED + VD1} \times t1$$

If the off-period Moff of T131 is shorter than (t2−t1), T131 will be turned on in a state where the flywheel current I3 is flowing through the diode D131. In this case, since a turn-off current of the diode D131 becomes large, a large current momentarily flows through the path formed by the capacitor C132, the diode D131, T131, and the ground, and thereby the capacitor C132 discharges. This current does not flow through the load 120, and so causes a reduction in efficiency.

Further, If T131 is turned on in a state where the flywheel current I3 is flowing, I2 varies by the flywheel current I3, and thereby the electric discharge quantity Q1 of the capacitor C132 varies. If the electric discharge quantity Q1 varies, I1, i.e. the AC input current Iac varies, and thereby a waveform of the AC input current Iac is disturbed.

Therefore, it is necessary to set the off-period Moff of T131 such that the flywheel current I3 disappears within the off-period Moff of T131.

For example, when Vac is 100V, VLED is 15V, and VD1 is 0.6V, a maximum value of Vdc is about 141V, and (t2−t1) is [8.08×t1(ms)]. That is, in this case, in order that I3 disappears within the off-period Moff of T131, it is necessary to set the off-period Moff of T131 8.08 times longer than the on-period Mon.

Next, I1 when T131 is turned off will be explained.

It is assumed that T131 shifts from on to off at the time t1. When I1(t) and VCp(t1) represent respectively I1 and VCp at the time t1, I1 is expressed by equation (11).

$$Vdc - VCp(t1) = L2 \times \frac{dI1}{dt} + \frac{1}{Cp} \times \int_{t1}^{t} I1 \, dt \quad (11)$$

Equation (12) is obtained by solving equation (11) on the condition that the Vdc is constant.

$$I1 = \sqrt{[Vdc - VCp(t1)]^2 \times \frac{Cp}{L2} + I1(t1)^2} \times \mathrm{SIN}\left(\frac{t - t1}{\sqrt{L2 \times Cp}} + \varphi\right) \quad (12)$$

$$\varphi = \mathrm{SIN}^{-1}\left[\frac{I1(t1)}{\sqrt{[Vdc - VCp(t1)]^2 \times \frac{Cp}{L2} + I1(t1)^2}}\right]$$

Since the capacitor C132 discharges when T131 is on, [Vdc−VCp(t1)] becomes plus at the time t1 when T131 shifts from on to off. Thus, I1 flows from Vdc to the capacitor C132 via the inductor L132 (C132 is charged). When I1 flows, VCp increases. I1 is, as represented by equation (12), a portion of a sine wave that has a phase advance φ at the time t1.

The period of the sine wave is represented as follows.

$$2\pi\sqrt{L2Cp}$$

Also, I1 has a peak value at a time when the following condition is satisfied.

$$\frac{t - t1}{\sqrt{L2 \times Cp}} + \varphi = \frac{\pi}{2}$$

This condition can be rewritten as follows.

$$(t - t1) = \left(\frac{\pi}{2} - \varphi\right) \times \sqrt{L2 \times Cp}$$

At this time, Vdc is equal to VCp [Vdc−VCp=0].

Then, VCp increases beyond Vdc, but I1 decreases.

VCp rapidly decreases in the next on-period of T131, and I1 is inverted from decreasing to increasing in this on-period. The one period is completed at the start time of the next off-period of T131.

That is, one period (=control period M) of a waveform of I1 that starts from the time t1 when T131 shifts from on to off has a waveform that consists of a portion of a half period of a sine wave and is convex upward. I1 has a waveform that consists of upwardly convex waveforms connected in series.

A waveform of I1 will be explained (see FIGS. 3 and 4).

When T131 is turned off at the time t1, I1 increases. Thus, the plus terminal voltage (voltage at the point r) VCp of the capacitor C132 increases. When [Vdc−VCp] varies according to the increase of VCp, I1 is also varies. At this time, the inductor L132 acts such that a variation of I1 is minimized. Here, I1 has a peak value at a time t3 when Vdc is equal to VCp [Vdc=VCp]. A slope of I1 becomes zero at the time t3 and becomes the smallest before and after the time t3. That is, a variation of a waveform is minimized in a case that the waveform has a peak value at the time t3 that is an intermediate point ([Vdc=VCp]) of the control period M (=off-period Moff+on-period Mon) starting from the time t1. In this case, I1 has a waveform (a part of the upwardly convex sine wave) that becomes maximal at the midpoint t3 and minimal at both end points of the control period M starting from the time t1.

Even though the waveform of I1 may be deviated from this waveform due to some disturbance, the waveform of I1 returns to this waveform by the action of the inductor L132.

A waveform of VCp corresponding to I1 will be explained (see FIGS. 3 and 4).

VCp becomes smaller than Vdc [Vdc>VCp] by discharging of the capacitor C132 in the on-period Mon [time t0~time t1] of T131 and becomes larger than Vdc [Vdc<VCp] by charging of the capacitor C132 in the off-period Moff of T131 [time t1~time t0]. That is, the waveform of VCp becomes minimal at the time t1 when T131 is turned off. Then, it increases until the time t3 that is the midpoint ([Vdc=VCp]) along a slight downwardly convex curve. Further, it increases along a slight upwardly convex curve. Then, it becomes maximal at the time t0 when T131 shifts from off to on. Then, it decreases in the next on-period Mon of T131 [time t0~time t1]. And then, it becomes minimal at the time t1 when T131 shifts from on to off.

As indicated in equation (4), if the on-period Mon [time t0~time t1] of T131 is constant, the electric discharge quantity Q1 is proportional to [Vdc−VLED].

Further, the AC input current Iac is advanced in phase by the amount of charge [ΔVdc×Cp] indicated in equation (5) with respect to the AC voltage Vac. As described above, if Cp is set such that (ΔVdc×Cp) is negligible small compared to Q1 [Q1»(ΔVdc×Cp)] in the control period M, an integral value of I1 in the control period M (=Cp electric charge quantity) is approximately equal to the electric discharge quantity Q1, and thereby it is possible to ignore the phase advance of the AC input current Iac with respect to the AC voltage Vac.

A variation width of the convex waveform of I1 (difference between a maximal value and a minimal value) depends on a ratio of the control period M to a half period $[\pi \times (L2 \times Cp)^{1/2}]$ of the sine wave representing the convex waveform of I1. If the half period of the sine wave is longer than the control period M, I1 continues to flow as the charging current of the capacitor C132 during the control period M of T131. As the half period of the sine wave is longer than the control period M, the variation width of the convex waveform of I1 becomes smaller, and harmonic components included in the AC input current Iac become smaller.

As described above, since the average value of I1 in the control period M is proportional to (Vdc−VLED), if I1 continues to flow during the control period M, the AC input current Iac is proportional to (Vdc−VLED). Thus, I1 is synchronized with the AC voltage Vac and includes less harmonic components, and thereby this embodiment can satisfy the Harmonic Current Standard (EN61000-3-2).

The following is a summary of the above.
1) In the case that T131 is turned on and off at the fixed control period M, if the on-period Mon of T131 is fixed, the electric discharge quantity Q1 discharged from the capacitor C132 (capacitance Cp) is proportional to (Vdc−VLED).

The electric discharge quantity Q1 is supplied as the current I2 to the load 120 during the on-period Mon of T131, and simultaneously the electromagnetic energy is accumulated in the inductor L131 (inductance L1). The electromagnetic energy accumulated in the inductor L131 is supplied to the load 120 as the flywheel current I3 during the off-period Moff of T131.

2) When ΔVdc represents the amount of variation of Vdc in the control period M and Cp is set such that (ΔVdc×Cp) is negligible small compared to the electric discharge quantity Q1, the electric charge quantity charged in the capacitor C132 (capacitance Cp) by the current I1 flowing from Vdc through the inductor L132 (inductance L2) in the control period M is equal to the electric discharge quantity Q1 discharged from the capacitor C132 in the control period M.

This can be likened to that the capacitor C132 operates as a measuring cup for measuring the amount of charge proportional to (Vdc-VLED) by fixing the on-period Mon of T131 in the fixed control period M.

Thus, the AC input current Iac proportional to (Vdc−VLED) flows in each control period M.

That is, by fixing the on-period Mon of T131, it is possible to improve the accuracy of the measurement of the amount of charge by the capacitor C132.

3) The current I1 that charges the capacitor C132 via the inductor L132 in the off-period Moff of T131 is expressed as a half-wave or a part thereof of a sine wave. If L2 and Cp is set such that the half of the sine wave $[\pi \times (L2 \times Cp)^{1/2}]$ is longer than the control period M, the current I1 flowing through the inductor L132, i.e., the AC input current Iac flows continuously during the control period M.

Thus, it is possible to suppress a variation of the AC input current Iac in every period M, and it is possible to suppress harmonic components included in the AC input current Iac.

4) It is ideal that an average value of I1 in every control period M is proportional to Vdc. However, when Vdc is smaller than VLED [Vdc<VLED], I1 does not flow. After that, when Vdc becomes larger than VLED [Vdc>VLED], I1 begins to flow. If I1 is proportional to Vdc, I1 increases stepwise from zero, and thereby harmonic components of which frequencies are close to that of the fundamental wave of the AC input current Iac increase.

On the other hand, if I1 is proportional to (Vds-VLED), when Vdc becomes larger than VLED [Vdc>VLED] and I1 begins to flow, I1 increases smoothly from zero. As a result, it is possible to suppress generation of harmonic components.

Second Embodiment

As described above, by fixing the control period M, the on-period Mon and the off-period Moff in the control period M, harmonic components included in the AC input current Iac can be suppressed.

On the other hand, if the on-period Mon and the off-period Moff in the control period M remains to be fixed, an output power increases when the AC voltage Vac becomes larger than a rated value. Further, it is impossible to adjust a light quantity of the LED used as the load. In order to prevent the output power from increasing when the AC voltage increases beyond the rated value and to be able to adjust the light quantity of the LED used as the load, it is necessary to be able to adjust the on-period Mon in the control period M.

Figure 2:
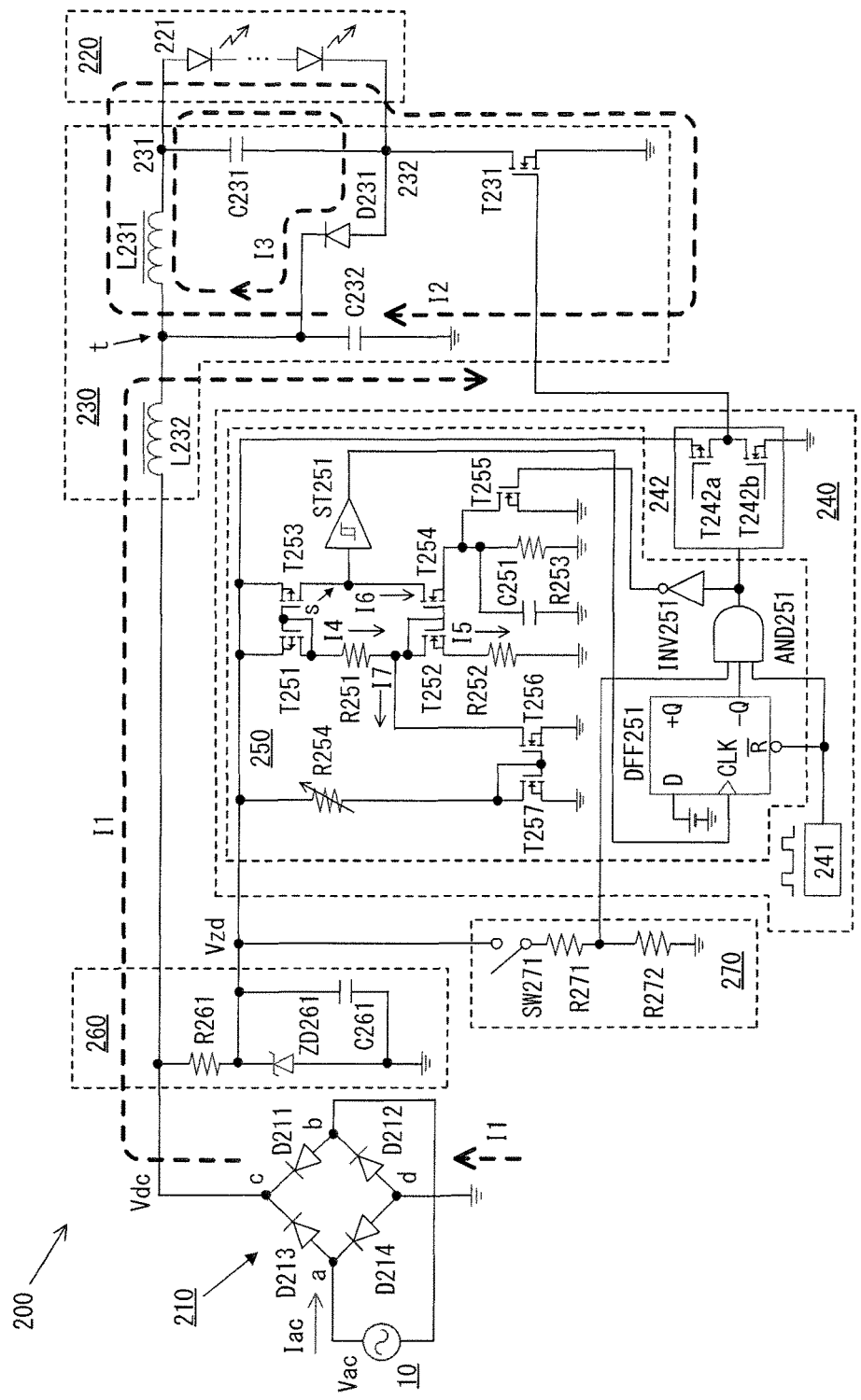
FIG. 2 is a circuit diagram showing a second embodiment of the power supply apparatus of the present invention.

A second embodiment comprises an on-period setting circuit that can optionally set the on-period Mon in the control period M of the switching element. Because the control period M (=Mon+Moff) is fixed, when the on-period Mon is set, the off-period Moff (=M−Mon) is also set A circuit diagram of a power supply apparatus 200 of the second embodiment is shown in FIG. 2. The power supply apparatus 200 of the second embodiment comprises, similar to the first embodiment, a full-wave rectifier circuit 210, a power supply circuit 230, a control circuit 240, a power circuit 260, and a drive signal output circuit 270.

The power supply apparatus 200 according to the second embodiment has the control circuit 240 different from the control circuit 140 of the power supply apparatus 100 according to the first embodiment. Therefore, in the following, only a configuration of the control circuit 240 will be explained. In FIG. 2, a component designated with the same reference numeral except for the third digit that is designated to the component shown in FIG. 1 is the same component that is shown in FIG. 1.

The control circuit 240 has a clock signal generating circuit 241, a drive circuit 242, and an on-period setting circuit 250. The clock signal generating circuit 241 and the drive circuit 242 are the same respectively as the clock signal generating circuit 141 and the drive circuit 142 of the control circuit 140 of the first embodiment.

In this embodiment, a clock signal period M of a clock signal generated from the clock signal generating circuit 241 is equal to a control period M of the switching element T231. However, a first period Ka when the clock signal is H-level and a second period Kb when the clock signal is L-level are different respectively from on-period Ma and off-period Mb of the switching element T231.

The on-period setting circuit 250 sets the on-period Mon of the switching element T231 based on the clock signal generated from the clock signal generating circuit 241 at a fixed clock signal period M.

The on-period setting circuit 250 has switching elements T251-T257, resistors R251-R253, a variable resistor (volume) R254, a capacitor C251, Schmitt trigger ST251, D flip-flop DFF 251, AND gate AND251, and an inverter INV251. In this embodiment, P-type MOSFETs are used as switching elements T251 and T253, and N-type MOSFETs are used as switching elements T252 and T254-T257.

Between the ground and the voltage Vzd generated by the power circuit 260, a series circuit composed of T251, R251, T252, and R252 is arranged. A gate and a drain each of T251 and T252 are short-circuited. Further, between the ground and Vzd, a series circuit composed of T253, T254, and R253 is arranged. A gate of T253 is connected to the gate of T251, and a current mirror circuit is constituted by T251 and T253. A gate of T254 is connected to the gate of T252, and a current mirror circuit is constituted by T252 and T254.

Further, C251 and T255 are arranged in parallel with R253.

An output terminal of AND251 is connected to a gate of T255 via INV251, and also connected to an input terminal of the drive circuit 242.

Each input terminal of AND251 is connected to an output terminal of the drive signal output circuit 270, an inverted output terminal (−Q) of DFF 251, or the output terminal of the clock signal generating circuit 241 respectively.

A voltage at a point s where the drains of T253 and T254 are connected is input to a clock terminal (CLK) of DFF251 via ST251. When H-level signal is input to the clock terminal (CLK) of DFF251, the inverted output terminal (−Q) of DFF251 becomes L-level. Further, when L-level signal is input to a reset terminal (R bar) of DFF251, DFF251 is reset (inverted output terminal (−Q) becomes H-level).

Further, between the ground and Vzd, a series circuit composed of R254 and T257 is arranged. A gate and a drain of T257 are short-circuited.

A gate of T256 is connected to the gate of T257, a drain of T256 is connected to a point where R251 and T252 are connected, and a source of T256 is connected to the ground. A current mirror circuit is constituted by T256 and T257.

The power circuit 260 that generates a predetermined voltage Vzd is a representative example of "a second DC power source" of the present invention. Either one of a connection point where the resistor R261 and the Zener diode ZD261 are connected or the ground is a representative example of "a first terminal of the second DC power source", and the other is a representative example of "a second terminal of the second DC power source" of the present invention.

T251 and T253 are representative examples of "first and second P-type MOSFETs" of the present invention, T252 and T254 are representative examples of "first and second N-type MOSFETs" of the present invention, T255 is a representative example of "a second switching element" of the present invention, R251-R253 are representative examples of "first to third resistances" of the present invention, and C251 is a representative example of "a third capacitor" of the present invention.

Next, an operation of the control circuit 240 will be explained. Here, I4 represents a current flowing through R251, I5 represents a current flowing through R252, I6 represents a current flowing through T253 and T254, and I7 represents a drain current of T256.

First, an operation of the control circuit 240 in a case that on-period adjustment function is not provided will be explained. This corresponds to a case that [I7=0] and [I4=I5] are satisfied in FIG. 2.

A channel width of T253 constituting the current mirror circuit with T251 is set to be larger than a channel width of T251. A channel width of T254 constituting the current mirror circuit with T252 is set to be smaller than a channel width of T252. Resistance value of R253 is set to be by a ratio of the channel width of T252 to the channel width of T254 inversely proportional to resistance value of R252.

If it is set so, when T255 is off and C251 is fully charged, a source voltage of T254 becomes equal to a source voltage of T252, and thereby I4 being equal to I5 becomes larger than I6 [I4=I5>I6].

The channel width of T253 is set such that a current which is larger than I4 can flow through T253. Therefore, I6 flowing through T253 and T254 becomes equal to a saturated current of T254. On the other hand, I6 flowing through T253 at this time is an unsaturated current. Therefore, a potential of the point s increases, and the output signal of ST251 becomes H-level.

In this state, when T255 is turned on, the capacitor C251 discharges, and a source of T254 is grounded. Thus, a voltage between the gate and the source of T254 becomes larger than a voltage between the gate and the source of T252 by a voltage (R252×I5), and so a current that can flow through T254 increases.

The channel width of T253 is set to be larger than the channel width of T251, but is set such that I6, that flows when the source of T254 is grounded, does not exceed a maximum current that can flow through T254 in that state. Thus, I6 flowing in that state is a saturated current of T253, but is an unsaturated current for T254. Therefore, the potential of the point s is reduced, and thereby the output signal of ST251 becomes L-level.

A relationship between the clock signal and the potential of point s will be explained.

When the drive signal of L-level is output from the drive signal output circuit 270, an output signal of AND251 is L-level. In this case, T231 is turned off, but T255 is turned on. Thus, the source of T254 is grounded, and the saturated current of T253 flows as I6. Therefore, the potential of the point s becomes L-level, and thereby the output signal of ST251 becomes L-level.

When the drive signal of H-level is output from the drive signal output circuit 270 and the clock signal becomes L-level, DFF 251 is reset, and thereby the inverted output terminal (−Q) becomes H-level. In this state, when the clock signal becomes H-level, the drive signal of H-level is output from AND251 to the drive circuit 242, and thereby T231 is turned on. At the same time, the gate of T255 is grounded by INV251, and thereby T255 is turned off.

When T255 is turned off, I6 flows through a parallel circuit consisting of R253 and C251. Thus, C251 is charged, and a voltage drop occurs across R253. In this state, I6 is a constant current because I6 is the saturated current of T253. Thus, the source voltage of T254 increases linearly.

When the source voltage of T254 approaches the source voltage of T252, the drain current of T254 shifts from the unsaturated current to the saturated current, and thereby I6 decreases. Accordingly, the drain current of T253 shifts from the saturated current to the unsaturated current. Therefore, the potential of the point s rapidly increases, and thereby the output signal of ST251 becomes H-level.

When H-level signal from ST251 is input to the clock terminal (CLK) of DFF 251, the inverted output terminal (–Q) of DFF 251 becomes L-level. Thus, the output signal of AND251 becomes L-level, and thereby T231 is turned off. At the same time, T255 is turned on. Thus, the potential of the point s decreases, and thereby the output signal of ST251 becomes L-level.

In this embodiment, the on-period Mon of T231 is from a time when the clock signal rises to H-level to a time when the output signal of ST251 is inverted from L-level to H-level caused by that the capacitor C251 is charged and then the potential of the point s becomes a predetermined potential.

In this embodiment, the first period Ka when the clock signal is H-level is set to exceed a period that is from the time when the clock signal rises to H-level (start time of the first period Ka) until the output signal of ST251 is inverted from L-level to H-level caused by that the potential of the point s becomes the predetermined potential.

When the clock signal becomes L-level, DFF 251 is reset, and thereby the inverted output terminal (–Q) becomes H-level.

The off-period Moff of T231 is from the time when the output terminal of ST251 is inverted from L-level to H-level to a time when the clock signal next rises to H-level next (start time of the next first period Ka).

That is, the on-period setting circuit 250 sets a period from the start time of the first period Ka until a predetermined time elapses as the on-period Mon of T231. The off-period Moff of T231 is from the time when the predetermined time has elapsed to a stat time of the next first period Ka.

Next, an operation in a case where I7 is an arbitrary value that is other than zero will be explained.

The on-period Mon of T231 varies according to the rate of increase of the source voltage of T254. Thus, for example, if the capacitance of the capacitor C251 is increased, the rate of increase of the source voltage of T254 becomes gentler, and thereby the on-period Mon of T231 becomes longer.

Further, the on-period Mon of T231 is proportional to (resistance value of the resistor R252×I5). Thus, for example, if reducing I5, the on-period Mon of T231 becomes shorter.

In this embodiment, by flowing a current I7 corresponding to an adjustment amount that is set by the variable resistor R254, the current I5 (=I4−I7) is adjusted, and thereby the on-period Mon of T231 is adjusted.

A drain current I7 of T256 is inversely proportional to a resistance value of the variable resistor R254 which is arranged between Vzd and a drain of T257 constituting the current mirror circuit with T256.

When I7 flows, I5 (=I4−I7) decreases. When I5 decreases, the source voltage of T252 (=resistance value of the resistor R252×I5) also decreases.

As a result, a period from a time when T255 shifts from on to off until the output signal of ST251 shifts from L-level to H-level caused by that the potential of the point s increases to the predetermined potential is shortened (becomes shorter).

That is, an on-period Mon of T231 becomes shorter by a time interval corresponding to I7 depended on R254 than that of T231 which is set without any I7 (any adjustment amount is not set).

The clock signal period M (=control period M) is fixed. Therefore, the off-period Moff of T231 is extended than the off-period Moff when I7 is zero by the time interval according to I7 set by R254 (becomes longer).

When I7 flows and the source voltage of T252 decreases, a voltage applied to R251 increases and I4 increases. When I4 increases, the saturated current of T253 increases and thereby the rate of increase of the source voltage of T253 increases. Therefore, although a rate of decrease of the on-period Mon of T231 is slightly larger than a rate of decrease of I5, the purpose of shortening the on-period Mon of T231 is achieved.

By shortening (reducing) the on-period Mon of T231 in the fixed control period M, it is possible to prevent an increase of the output power due to an increase of the AC voltage Vac. Further, it is possible to reduce the amount of light of LED that is used as the load.

In this embodiment, the on-period setting circuit 250 sets a period from the start time of the first period Ka of the clock signal until a predetermined time adjusted by the adjustment amount that is set by an adjustment amount setting circuit (variable resistor R254) elapses as the on-period Mon of T231.

FIG. 3 and FIG. 4 show results obtained by simulating the power supply apparatus 100 of the first embodiment. Here, FIG. 4 is an enlarged view of a portion IV (31 ms-31.12 ms) in FIG. 3.

Circuit parameters used in the simulation are as follows. Vac: AC100V (effective voltage), 60 Hz, L1: 30 µH, L2: 600 µH, Cp: 0.5 µF, C1: 2000 µF, control period (clock signal period): 30 µs [on-period (H-level period): 4.509 µs], average value of VLED: 26.3V, average value of the load current: 2.92 A.

The adjustment of the control period M and the on-period Mon in the control period M is performed by using an analog circuit, but of course, it may be carried out by software by using a microcomputer or the like.

In FIG. 3, a horizontal axis represents time (unit: ms), a first vertical axis represents voltage of a graph (A) (unit: V), a second vertical axis represents current of a graph (C) (unit: A).

The graph (A) represents DC voltage Vdc, the graph (C) represents current (charging current) I1 supplied from Vdc to the capacitor C132.

FIG. 4 is the enlarged view of the portion IV in FIG. 3. A graph (B) (positive terminal voltage VCp of the capacitor C132) and a graph (D) [current (I2+I3) flows through the inductor L131] are not shown in FIG. 3, but added to FIG. 4. Voltage value of the graph (B) is represented by a first vertical axis of FIG. 4 (unit: V) and current value of the graph (D) is represented by a third axis of FIG. 4 (unit: A).

Vdc can be regarded as a constant value in the enlarged view shown in FIG. 4.

VCp becomes larger than Vdc [VCp>Vdc] in a later half of the off-period Moff of T131 (between times t1 and t0), and becomes maximal at an end time of the off-period Moff.

When T131 shifts from off to on (time t0), VCp rapidly decreases along an upwardly convex parabola. This is because that since the electric discharge quantity Q1 of the capacitor C132 is proportional to the square of the on-period Mon (between times t0 and t1) as represented by the equation (4), when $\Delta VCp$ represents a decrease amount from a maximal value of VCp, $[\Delta VCp=Q1/Cp]$ is satisfied.

VCp becomes minimal at the time t1 when T131 shifts from off to on. At this time, VCp is smaller than Vdc [VCp<Vdc].

Thereafter, I1 increases by the action of a voltage difference (Vdc−Vcp) and the inductor L132, and VCp increases as the capacitor C132 is charged. At a time t3 when VCp is equal to Vdc [VCp=Vdc], I1 reaches a peak (maximal). Thereafter, VCp continues to increase by a counter electromotive force of the inductor L132, but I1 turns to decrease.

I1 has an upwardly convex waveform that is a part of the sine wave represented by the equation (12), and reaches a peak (maximal) at the midpoint (time t3) of the off-period Moff of T131 (between times t1 and t0) and becomes minimal at the time t1 when T131 shifts from on to off. The reason why I1 has such waveform is that, as described above, the inductor L132 acts such that a gradient of I1 is minimized.

Although VCp increases approximately linearly in the off-period of T131 (between times t1 and t0), a point where VCp is equal to Vdc [VCp=Vdc] is slightly delayed from a point where I1 reaches a peak. Therefore, the entire waveform of VCp is relatively under Vdc. This is because that VCp is lowered from Vdc by a voltage drop caused by that I1 flows through an internal resistor (0.8Ω) of the inductor L132.

A current (I2+I3) flowing through the inductor L131 linearly increases in the on-period Mon of T131 (between times t0 and t1), and then linearly decreases when T131 shifts from on to off, and disappears within the off-period Moff (between times t1 and t0). The portion that linearly increases in the on-period Mon of T131 represents I2. The portion that linearly decreases in the off-period Moff of T131 represents I3.

From the result of the simulation, it is found that the power factor is 99.7% and the efficiency is 95.2%, and thereby harmonic currents satisfy the Class C of the Standard (EN61000-3-2).

Third Embodiment

Figure 5:
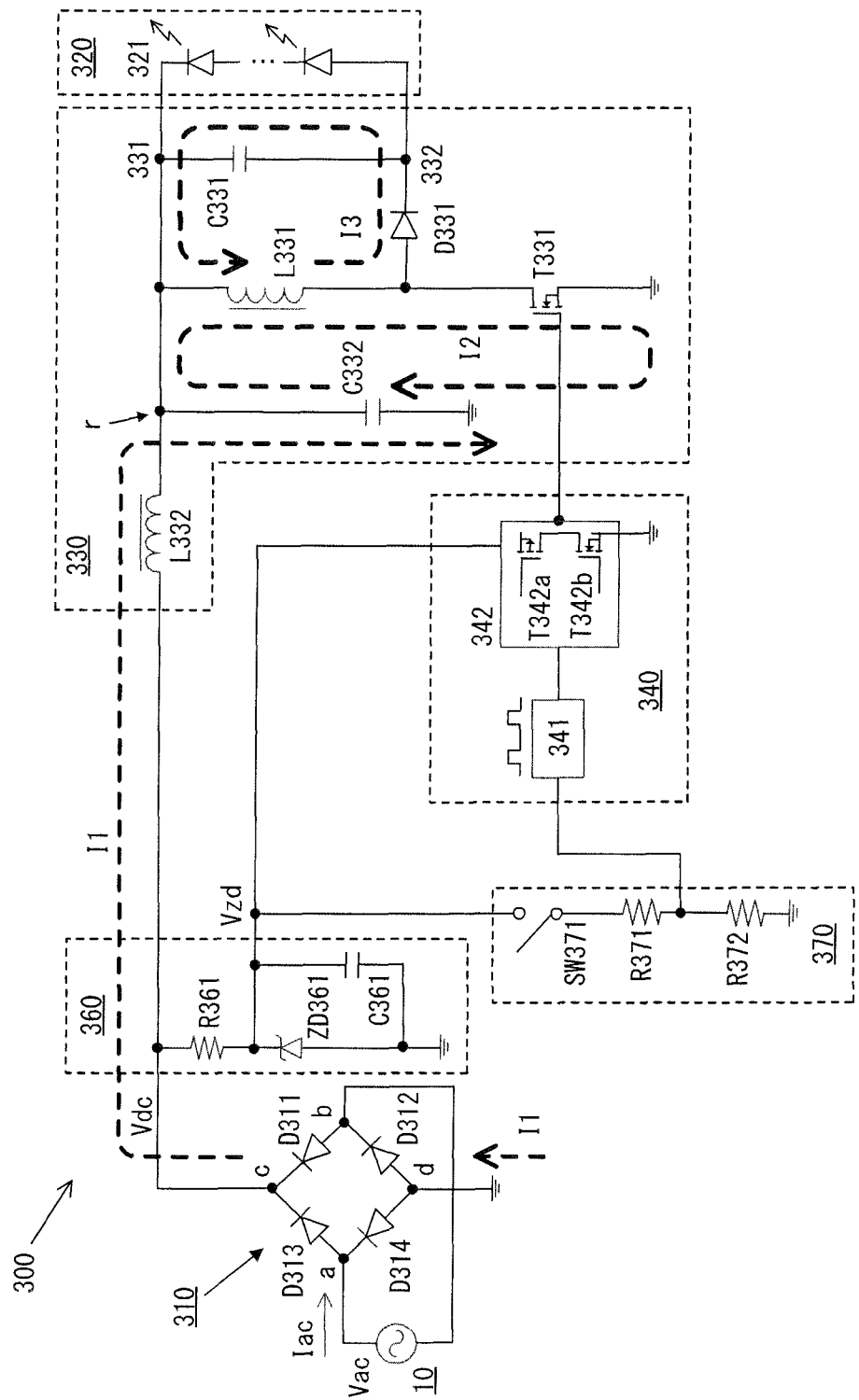
FIG. 5 is a circuit diagram showing a third embodiment of the power supply apparatus of the present invention.

A circuit diagram of a third embodiment 300 of the power supply apparatus of the present invention is shown in FIG. 5.

In the third embodiment, a configuration of a power supply circuit 330 is different from the power supply circuit 130 of the first embodiment. Therefore, in the following, only a configuration of the power supply circuit 330 will be explained.

In FIG. 5, a component designated with the same reference numeral except for the third digit that is designated to the component shown in FIG. 1 is the same component that is shown in FIG. 1.

The power supply circuit 330, similar to the power supply circuit 130 of the first embodiment, comprises first and second capacitors C331 and C332, first and second inductors L331 and L332, a diode (flywheel diode) D331, and a first switching element T331.

In this embodiment, between a positive electrode c and the ground, the inductor L332 having inductance L2 and the capacitor C332 having capacitance Cp are arranged in series.

The inductor L331 having inductance L1 and the switching element T331 are arranged in series to the capacitor C332.

A series circuit composed of the diode D331 and a parallel circuit consisting of the capacitor C331 having capacitance C1 and a load 320 is arranged in parallel with the inductor L331. An anode of the diode D331 is connected to a connection point where the inductor L331 and the switching element T331 are connected. Therefore, a polarity each of LEDs 321 used as the load 320 is inverted.

When T331 is turned on, a discharging current I2 caused by electric charge accumulated in the capacitor C332 flows through a path formed by the inductor L331, T331 and the ground. At this time, due to the presence of the diode D331, a current does not flow through the parallel circuit consisting of the capacitor C331 and the load 320.

When T331 is turned off, a flywheel current I3, that is caused by an electromagnetic energy accumulated in the inductor L331 while T331 is on, flows through a path formed by the diode D331 and the parallel circuit consisting of the capacitor C331 and the load 320. At the same time, a charging current I1 from Vdc flows to the capacitor C332 via the inductor L332.

The electric discharge quantity Q1 of the capacitor C332 in the on-period of T331 is represented by equation (13) that is obtained by replacing (Vdc−VLED) with Vdc in the above-mentioned equation (4).

$$Q1 = \int_0^{t1} I2 dt = \frac{Vdc}{2 \times L1} \times t1^2 \qquad (13)$$

In the equation (13), as the equation (4), t1 represents the on-period Mon of T331, Vdc represents pulsating DC voltage, and L1 represents inductance of L331.

As for a calculation method for calculating I2 and I3 in FIG. 5, it is possible to apply the same calculation method for calculating I2 and I3 in FIG. 1 by setting VLED in the above-mentioned equation (1) to zero [VLED=0] and replacing (Vdc−VLED) in equations (2) to (4) and (8) to (10) with Vdc. A method for calculating I1 is the same as the calculation method for calculating I1 in FIG. 1.

Accordingly, this embodiment can also realize a stable PFC control by setting such that I3 disappears within the off-period Moff of T331, for example, by setting the inductance L2 of the inductor L332 and the capacitance Cp of the capacitor C332 such that the half period [π×(L2×Cp)$^{1/2}$] of the sine wave of I1 is longer than the control period M.

The power supply circuit 130 of the first embodiment operates as a buck converter and the power supply circuit 330 of the third embodiment operates as a buck-boost converter. The power supply circuit 330 of the third embodiment has following features as compared with the power supply circuit 130 of the first embodiment.

1) The electric discharge quantity Q1 in the first embodiment depends on (Vdc−VLED) as represented by the equation (4). Therefore, when VLED varies, also the electric discharge quantity Q1 varies accordingly. In contrast, the electric discharge quantity Q1 in the third embodiment does not include VLED as represented by the equation (13). Therefore, it is possible to realize the stable PFC control without being affected by variations of VLED.

2) In the first embodiment, I1 does not flow in a state where Vdc is smaller than VLED [Vdc<VLED].
    In contrast, in the third embodiment, there is not such constraint. Therefore, I1 flows even when Vdc decreases (range in where I1 flows is expanded). This contributes to suppression of harmonic components of I1.

In the first embodiment 100 (second embodiment 200), the inductor L131 (L231), the parallel circuit consisting of the load 120 (220) and the capacitor C131 (C231) are connected in series. Therefore, even if positions of the inductor L131 (L231) and the parallel circuit consisting of the load 120 (220) and the capacitor C131 (C231) are changed, the resulting effect does not change.

Further, in the first embodiment 100 and the second embodiment 200, the DC power source having the full-wave rectifier circuit that converts the AC voltage to the pulsating DC voltage obtained by full-wave rectifying the AC voltage is used. However, a battery or the like may be used as the DC power source. The reason is that the DC power source such as a battery can be regarded as a DC power source that generates a pulsating DC voltage having an infinite period. In a case where the battery or the like is used as the DC power source, it is not necessary to consider a phase shift of the AC input current to the AC voltage (power factor) unlike in the case where the DC power source having the full-wave rectifier is used, but the effect of suppressing harmonic components included in the current supplied from the DC power source is maintained. Therefore, there are such effects that it is possible to remove or reduce the size of the low-pass filter for suppressing harmonic components and it is possible to eliminate parts and current detecting processes for detecting the current flowing through the switching element.

In this embodiment, a DC power source such as a battery or the like is a representative example of "a third DC power source" of the present invention.

The present invention is not limited to the configuration described in the detailed description. Various modifications, additions, and deletes are possible without departing from the scope and the spirit of the present invention.

The power supply apparatus for supplying DC power to the load having light-emitting diodes has been explained. However, the power supply apparatus of the present invention can be used for supplying DC power to various loads other than light-emitting diodes.

The value of the elements forming each circuit (e.g., inductance, capacitance, resistance) can be suitably set according to a type of the load, and so on.

A FET is preferably used as the switching element for supplying power to the load. Of course, an element other than a FET can be used as the switching element.

In the embodiments, it is configured that the switching element is turned on when the clock signal is H-level and turned off when the clock signal is L-level. It can be configured that the switching element is turned on when the clock signal is L-level and turned off when the clock signal is H-level.

DESCRIPTION OF THE REFERENCE NUMERALS

10 . . . AC power source,
100, 200, 300, 400 . . . power supply apparatus,
110, 210, 310, 410 . . . full-wave rectifier circuit,
120, 220, 320, 420 . . . load,
121, 221, 321, 421 . . . light-emitting diode (LED),
130, 230, 330, 430 . . . power supply circuit,
140, 240, 340, 440 . . . control circuit,
141, 241, 341 . . . clock signal generating circuit,
142, 242, 342 . . . drive circuit,
160, 260, 360 . . . power circuit,
170, 270, 370 . . . drive signal output circuit,
250 . . . on-period setting circuit,
480 . . . low-pass filter,
L131, L132, L231, L232, L331, L332, L431, L481, L482 . . . inductor,
C131, C132, C231, C232, C251, C331, C332 C431, C481, C482 . . . capacitor,
D131, D231, D331, D431 . . . flywheel diode,
T131, T231, T255, T331, T431 . . . switching element, and
R254 . . . variable resistor (adjustment amount setting circuit).

The invention claimed is:

1. A power supply apparatus comprising:
a first DC power source that generates a DC voltage obtained by rectifying an AC voltage between a positive electrode and a negative electrode,
a power supply circuit that is arranged between the first DC power source and a load, and
a control circuit that controls the power supply circuit, wherein:
the power supply circuit includes a first capacitor, a second capacitor, a first inductor, a second inductor, a diode, and a first switching element,
the first capacitor is electrically connected in parallel with the load,
a first series circuit comprises the second inductor and the second capacitor, the first series circuit being electrically connected between the positive electrode and the negative electrode of the first DC power source,
a second series circuit comprises the first inductor, a parallel circuit, which comprises the first capacitor and the load, and the first switching element, the second series circuit being electrically connected in parallel with the second capacitor, and
a third series circuit comprises the parallel circuit and the first inductor, the third series circuit being electrically connected in parallel with the diode,
the control circuit is configured such that the first switching element is turned on during a fixed on-period (Mon) and turned off during a fixed off-period (Moff) in each fixed control period (M), wherein the fixed off-period (Moff) equals the fixed control period (M) minus the fixed on-period (Mon), and
the power supply apparatus is configured such that:
when the first switching element is turned on, a discharging current caused by electric charge accumulated in the second capacitor flows through a path formed by the second capacitor and the second series circuit,
when the first switching element is turned off, a flywheel current caused by electromagnetic energy accumulated in the first inductor flows through a path formed by the third series circuit and the diode, and a charging current flows from the first DC power source to the second capacitor via the second inductor,
the second inductor has an inductance (L2), the second capacitor has a capacitance (Cp), and the fixed control period (M) is set such that $M < \pi \times (L2 \times Cp)^{1/2}$ is satisfied,
the charging current is supplied from the first DC power source to both of the second inductor and the second capacitor during the fixed control period (M),
owing to the inductance (L2) of the second inductor, the charging current changes according to a portion of an upwardly convex sine wave that has minimums at both ends of the fixed control period (M) and a maximum at a midpoint of the fixed control period (M), and
the fixed control period (M) starts when the on-period (Mon) transitions to the off-period (Moff).

2. The power supply apparatus according to claim 1 wherein the power supply apparatus is configured such that the flywheel current disappears within the off-period (Moff) when the first switching element is off.

3. The power supply apparatus according to claim 1 wherein
the control circuit has a second DC power source that generates a predetermined DC voltage between a first terminal and a second terminal and an on-period setting circuit, the on-period setting circuit has first and second P-type MOSFETs, first and second N-type MOSFETs, first to third resistors, a third capacitor, and a second switching element, the first P-type MOSFET, the first resistor, the first N-type MOSFET, and the second resistor are arranged in series between the first terminal and the second terminal of the second DC power source, the second P-type MOSFET, the second N-type MOSFET, and the third resistor are arranged in series between the first terminal and the second terminal of the second DC power source, the third capacitor and the second switching element are arranged in parallel with the third resistor, a gate and a drain of the first P-type MOSFET are short-circuited, and a gate and a drain of the first N-type MOSFET are short-circuited, a gate of the second P-type MOSFET is connected to the gate of the first P-type MOSFET, and a gate of the second N-type MOSFET is connected to the gate of the first N-type MOSFET, a ratio of a channel width of the first P-type MOSFET to a channel width of the second P-type MOSFET, a ratio of a channel width of the first N-type MOSFET to a channel width of the second N-type MOSFET, and a ratio of resistance value of the second resistor to a resistance value of the third resistor are set such that when the second switching element is on, a drain-source voltage of the second P-type MOSFET is larger than a drain-source voltage of the second N-type MOSFET, and when the second switching element is off and the third capacitor is fully charged, the drain-source voltage of the second P-type MOSFET is smaller than the drain-source voltage of the second N-type MOSFET, the second switching element is turned off at a start time of the control period M, and the on-period setting circuit sets a period, that is from the start time of the control period (M) to a time when the drain-source voltage of the second P-type MOSFET becomes smaller than the drain-source voltage of the second N-type MOSFET, as the on-period Mon.

4. The power supply apparatus according to claim 3 wherein the power supply apparatus is configured such that the flywheel current disappears within the off-period (Moff) when the first switching element is off.

5. The power supply apparatus according to claim 1 wherein a third DC power source that generates a predetermined DC voltage between the positive electrode and the negative electrode is used instead of the first DC power source that generates the DC voltage obtained by rectifying the AC voltage between the positive electrode and the negative electrode.

6. A power supply apparatus comprising:
a first DC power source that generates a DC voltage obtained by rectifying an AC voltage between a positive electrode and a negative electrode,
a power supply circuit that is arranged between the first DC power source and a load, and
a control circuit that controls the power supply circuit, wherein:
the power supply circuit includes a first capacitor, a second capacitor, a first inductor, a second inductor, a diode, and a first switching element,
the first capacitor is electrically connected in parallel with the load, a first series circuit comprises the second inductor and the second capacitor, the first series circuit being electrically connected between the positive electrode and the negative electrode of the first DC power source, a second series circuit comprises the first inductor and the first switching element, the second series circuit being electrically connected in parallel with the second capacitor, and a third series circuit comprises the diode and a parallel circuit, which comprises the first capacitor and the load, the third series circuit being electrically connected in parallel with the first inductor, the control circuit is configured such that the first switching element is turned on during a fixed on-period (Mon) and turned off during a fixed off-period (Moff) in each fixed control period (M), wherein the fixed off-period (Moff) equals the fixed control period (M) minus the fixed on-period (Mon), and the power supply apparatus is configured such that:
when the first switching element is turned on, a discharging current caused by electric charge accumulated in the second capacitor flows through a path formed by the second capacitor and the second series circuit, when the first switching element is turned off, a flywheel current caused by electromagnetic energy accumulated in the first inductor flows through a path formed by the first inductor and the third series circuit, and a charging current flows from the first DC power source to the second capacitor via the second inductor, the second inductor has an inductance (L2), the second capacitor has a capacitance (Cp), and the fixed control period (M) is set such that $M < \pi \times (L2 \times Cp)^{1/2}$ is satisfied, the charging current is supplied from the first DC power source to both of the second inductor and the second capacitor during the fixed control period (M), owing to the inductance (L2) of the second inductor, the charging current changes according to a portion of an upwardly convex sine wave that has minimums at both ends of the fixed control period (M) and a maximum at a midpoint of the fixed control period (M), and the fixed control period (M) starts when the on-period (Mon) transitions to the off-period (Moff).

7. The power supply apparatus according to claim 6 wherein the power supply apparatus is configured such that the flywheel current disappears within the off-period (Moff) when the first switching element is off.

8. The power supply apparatus according to claim 6 wherein
the control circuit has a second DC power source that generates a predetermined DC voltage between a first terminal and a second terminal and an on-period setting circuit, the on-period setting circuit has first and second P-type MOSFETs, first and second N-type MOSFETs, first to third resistors, a third capacitor, and a second switching element, the first P-type MOSFET, the first resistor, the first N-type MOSFET, and the second resistor are arranged in series between the first terminal and the second terminal of the second DC power source, the second P-type MOSFET, the second N-type MOSFET, and the third resistor are arranged in series between the first terminal and the second terminal of the second DC power source, the third capacitor and the second switching element are arranged in parallel with the third resistor, a gate and a drain of the first P-type MOSFET are short-circuited, and a gate and a drain of the first N-type MOSFET are short-circuited, a gate of the second P-type MOSFET is connected to the gate of the first P-type MOSFET, and a gate of the second N-type MOSFET is connected to the gate of the first N-type MOSFET, a ratio of a channel width of the first P-type MOSFET to a channel width of the second P-type MOSFET, a ratio of a channel width of the first N-type MOSFET to a channel width of the second N-type MOSFET, and a ratio of resistance value of the second resistor to a resistance value of the third resistor are set such that when the second switching element is on, a drain-source voltage of the second P-type MOSFET is larger than a drain-source voltage of the second N-type MOSFET, and when the second switching element is off and the third capacitor is fully charged, the drain-source voltage of the second P-type MOSFET is smaller than the drain-source voltage of the second N-type MOSFET, the second switching element is turned off at a start time of the control period (M), and the on-period setting circuit sets a period, that is from the start time of the control period (M) to a time when the drain-source voltage of the second P-type MOSFET becomes smaller than the drain-source voltage of the second N-type MOSFET, as the on-period (Mon).

9. The power supply apparatus according to claim 8 wherein the power supply apparatus is configured such that the flywheel current disappears within the off-period (Moff) when the first switching element is off.

10. The power supply apparatus according to claim 6 wherein a third DC power source that generates a predetermined DC voltage between the positive electrode and the negative electrode is used instead of the first DC power source that generates the DC voltage obtained by rectifying the AC voltage between the positive electrode and the negative electrode.

* * * * *